(12) United States Patent
Sekimoto

(10) Patent No.: US 10,802,464 B2
(45) Date of Patent: Oct. 13, 2020

(54) NUMERICAL CONTROLLER

(71) Applicant: FANUC CORPORATION, Minamitsuru-gun, Yamanashi (JP)

(72) Inventor: Kouji Sekimoto, Minamitsuru-gun (JP)

(73) Assignee: Fanuc Corporation, Yamanashi (JP)

( * ) Notice: Subject to any disclaimer, the term of this patent is extended or adjusted under 35 U.S.C. 154(b) by 59 days.

(21) Appl. No.: 16/202,814

(22) Filed: Nov. 28, 2018

(65) Prior Publication Data
US 2019/0171180 A1    Jun. 6, 2019

(30) Foreign Application Priority Data

Dec. 6, 2017    (JP) .................................. 2017-234483

(51) Int. Cl.
*G05B 19/402*    (2006.01)
(52) U.S. Cl.
CPC .. *G05B 19/402* (2013.01); *G05B 2219/42249* (2013.01)
(58) Field of Classification Search
USPC ........................................................ 700/186
See application file for complete search history.

(56) References Cited

U.S. PATENT DOCUMENTS

| 6,909,939 B1* | 6/2005 | Yamada ................. G05B 19/19 |
| | | 700/189 |
| 2011/0044778 A1 | 2/2011 | Yamada et al. |
| 2015/0286197 A1 | 10/2015 | Sonoda |
| 2016/0327938 A1* | 11/2016 | Kawai .............. G05B 19/40937 |

FOREIGN PATENT DOCUMENTS

| JP | 2011044081 A | 3/2011 |
| JP | 2014075031 A | 4/2014 |
| JP | 2015-201958 A | 11/2015 |

OTHER PUBLICATIONS

Japanese Decision to Grant a Patent for Japanese Application No. 2017-234483, dated Dec. 3, 2019, with translation, 5 pages.

* cited by examiner

*Primary Examiner* — Mohammad Ali
*Assistant Examiner* — Joshua T Sanders
(74) *Attorney, Agent, or Firm* — RatnerPrestia

(57) ABSTRACT

The numerical controller controls a machine tool and performs rigid tapping on a cutting surface of a workpiece. The numerical controller determines, based on a first allowable synchronization error between a rotation of a spindle and movement of each axis of a workpiece coordinate system and an inclination angle of a cutting surface, a second allowable synchronization error between a spindle and a feed axis and monitors a synchronization error between the spindle and the feed axis based on a second allowable synchronization error that has been determined.

1 Claim, 4 Drawing Sheets

- RIGID TAPPING ON WORKPIECE SURFACE PARALLEL TO XY PLANE

- RIGID TAPPING ON WORKPIECE INCLINED IN AXIAL DIRECTION

NUMERICAL CONTROLLER

CROSS-REFERENCE TO RELATED APPLICATION

This application is a new U.S. Patent Application that claims benefit of Japanese Patent Application No. 2017-234483, filed Dec. 6, 2017, the disclosure of this application is being incorporated herein by reference in its entirety for all purposes.

BACKGROUND OF THE INVENTION

1. Field of the Invention

The present invention relates to a numerical controller, and in particular to a numerical controller that has a function for changing a threshold of an allowable synchronization error with respect to a spindle in accordance with an inclination of a cutting surface.

2. Description of the Related Art

Rigid tapping may be performed when a threaded hole is to be machined. In rigid tapping, movement of a tool by a feed axis (tap axis) and rotation of the tool by a spindle are synchronized with each other to perform cutting (for example, see Japanese Patent Application Laid-Open No. 2015-201968). Any of the linear feed axis's three axes (i.e., X, Y, and Z axes) is usually used as the tap axis in rigid tapping. In this case, when the rigid tapping is vertically performed on an inclined cutting surface, the workpiece coordinate system is inclined, and thus the tapping is performed in an axial direction orthogonal to the cutting surface. For example, as illustrated by way of example in FIG. 4, when the rigid tapping is performed on a surface A of a workpiece 2 parallel to an XY plane of the machine coordinate system among the respective surfaces of the workpiece, then the tool 3 is moved along the Z axis to perform the machining.

In contrast, as illustrated by way of example in FIG. 5, when the rigid tapping is performed on a surface B of the workpiece 2 that is not parallel to the axes of the machine coordinate system among the surfaces of the workpiece 2, then the workpiece coordinate system X' Y' Z' is inclined with respect to the machine coordinate system, the tool 3 is moved along the Z' axis (in the machine coordinate system, the tool is moved along the X axis, the Y axis, and the Z axis), and thus the machining is performed.

In the rigid tapping, when an error in the synchronization among the axes occurs, damage to the tool and collapse of the screw thread may happen. As a result, at the time of the tapping operation in the rigid tapping, an allowable synchronization error amount between the spindle and each of the tap axes is defined in advance along with the allowable movement error amount among the tap axes and, if the error in the synchronization between the axes exceeds the allowable error mount, an alarm or the like is generated to instruct stoppage of the machining.

When rigid tapping is performed on the workpiece surface inclined with respect the axis of the machine coordinate system, as illustrated with reference to FIG. 5, the movement of the tool in the tapping operation is realized by synthesized operation of the basic three axes in the machine coordinate system. Meanwhile, in the case of prior-art techniques, the above-described allowable synchronization amount is defined as an error that is allowable in the machine coordinate system. As a result, in a case where the cutting surface of a workpiece is not inclined with respect to the axis of the machine coordinate system, errors of the X, Y, and Z axes with respect to the spindle and specified allowable synchronization error thresholds ($X_{err}$, $Y_{err}$, $Z_{err}$) are compared with each other and determination thereof is performed using a predefined allowable synchronization error amount, and thereby it is made possible to determine whether or not the threaded hole to be machined is formed with the desired precision. In a case where the cutting surface of a workpiece is inclined with respect to the axis of the machine coordinate system, on the other hand, if the allowable synchronization error thresholds between the spindle and each axis are uniformly set such that they agree with each other and then these thresholds are used for determination in the machine coordinate system, then it is not possible to correctly determine whether or not the desired precision is ensured in machining the inclined surface.

For example, consider a rigid tapping performed on the surface B which is an inclined surface as illustrated in FIG. 5. In FIG. 5, the workpiece coordinate system X'Y'Z' is inclined with respect to the machine coordinate system to be in line with the inclined surface of the workpiece (the surface B), where the X' axis and the Y axis are parallel to each other, and the angle between the Z' axis and the Z axis is 60°. In this case, the operation in the direction of Z' axis which is a tap axis is determined depending solely on the synthesis of the operations of the X axis and the Z axis. Here, when the setting requires ($X_{err}$, $Y_{err}$, $Z_{err}$)=(300, 300, 500), then in a case where the surface A is machined as illustrated in FIG. 4, the Z axis serves as the tap axis and, if the synchronization error does not exceed 500 between the spindle and the Z axis, the machining at issue is allowed and it can be confirmed that a desired precision is ensured. However, when the surface B is machined as illustrated in FIG. 5, the Z' axis serves as the tap axis and the component ratio of the Z axis to the movement distance in the Z' direction is small when compared with the case where the Z axis is the tap axis, so that, when the synchronization error specified for the Z axis is applied on an as-is basis, then it is not possible to confirm whether or not the machining is successfully performed with a desired precision.

SUMMARY OF THE INVENTION

In view of the above, an object of the present invention is to provide a numerical controller capable of carrying out a rigid tapping with desired precision maintained even when a cutting surface is inclined.

According to the numerical controller of the present invention, the above-described problem is solved by providing a function for automatically changing the threshold of an allowable synchronization error with respect to a spindle by a component ratios of individual movement axes with respect to a movement distance in a tap direction when the rigid tapping is performed on an inclined surface.

The numerical controller according to an aspect of the present invention controls a machine tool which includes a spindle adapted to rotate a tool and at least linear two feed axes adapted to move the tool relative to a workpiece. The numerical controller is configured to perform rigid tapping on a cutting surface by moving the tool in a tap direction such that the tool vertically faces the cutting surface which is inclined with respect to at least any one of axes of a machine coordinate system of the machine tool. The numerical controller includes: a parameter storage unit configured to store a predefined first allowable synchronization error, the first allowable synchronization error being an allowable synchronization error between a rotation of the spindle and a movement of each axis of a workpiece coordinate system, wherein the tap direction is set to any one of the axes of the workpiece coordinate system; a preprocessing unit configured to acquire an inclination angle of the cutting surface; an allowable synchronization error determination unit configured to determine a second allowable synchronization error on the basis of the first allowable synchronization error and the inclination angle, the second allowable synchronization error being an allowable synchronization error between the spindle and the feed axis; and a synchronization error monitoring unit configured to monitor a synchronization error between the spindle and the feed axis on the basis of the second allowable synchronization error.

According to the present invention, when the rigid tapping is performed on the inclined surface, it is made possible to confirm whether or not the desired precision is achieved during the machining by automatically changing the threshold for the allowable synchronization error with respect to the spindle by the component ratios of the individual movement axes with respect to the movement distance in the tap direction.

DETAILED DESCRIPTION OF THE PREFERRED EMBODIMENTS

Figure 1:
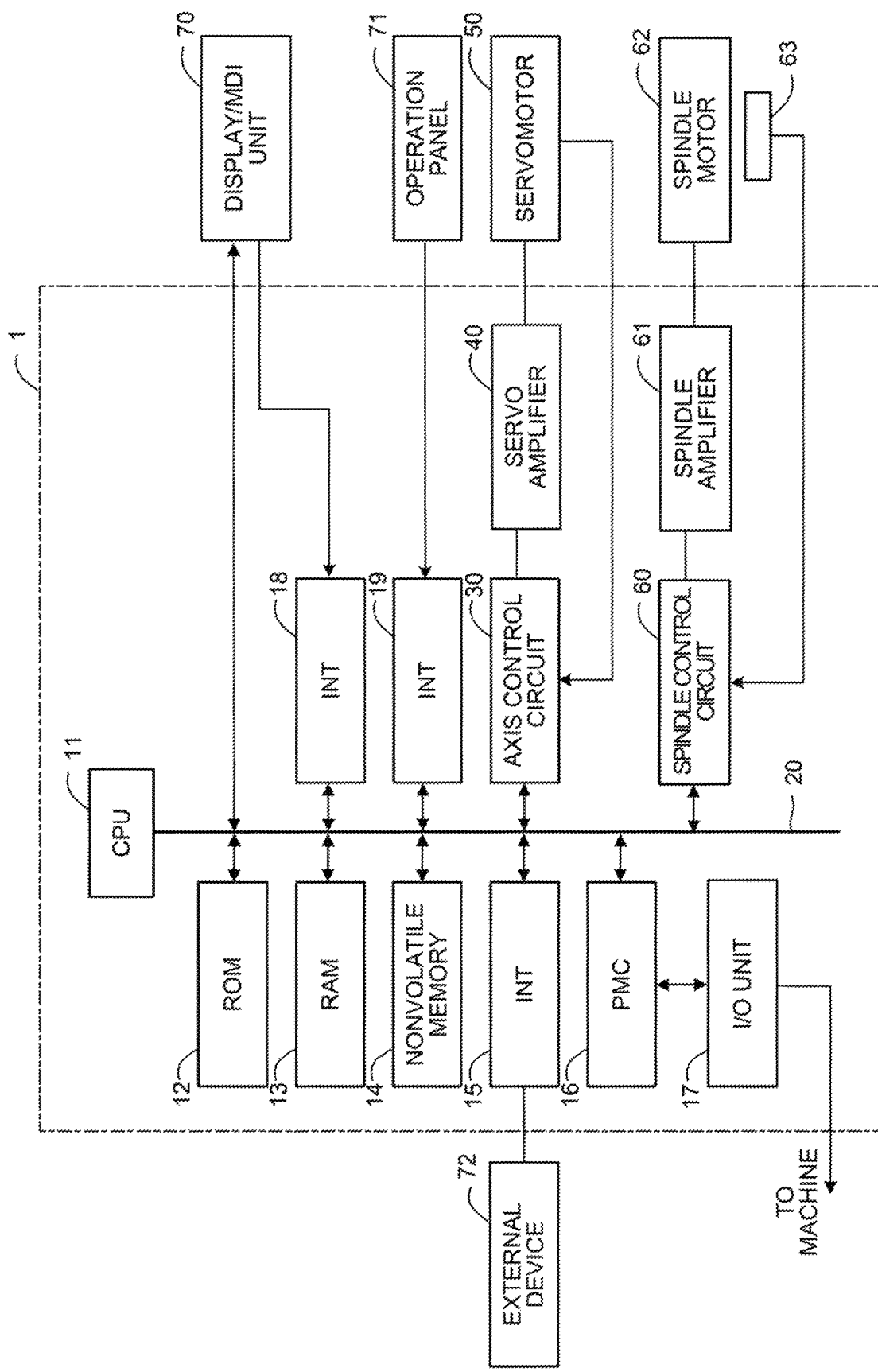
FIG. 1 is a schematic hardware configuration diagram illustrating principal portions of a numerical controller according to an embodiment of the present invention and a machine tool driven and controlled by the numerical controller.

FIG. 1 is a schematic hardware configuration diagram that illustrates principal portions of the numerical controller according to an embodiment and a machine tool driven and controlled by the numerical controller.

The numerical controller 1 according to this embodiment includes a central processing unit (CPU) 11. The CPU 11 is a processor configured to control the numerical controller 1 as a whole. The CPU 11 is configured to read a system program stored in a ROM 12 via a bus 20 and control the numerical controller 1 as a whole in accordance with the system program. The numerical controller 1 also includes a RAM unit 13 configured to store information such as temporary computation data and pieces of data to be displayed as well as various pieces of data input by an operator via a display/MDI unit 70 which will be described later.

The numerical controller 1 further includes a non-volatile memory 14 which is configured as a memory unit whose state of storage is retained even when a power source of the numerical controller 1 is turned off by, for example, being backed up by a battery (not shown). The non-volatile memory 14 may be configured to store an NC program read via an interface 15 and NC programs input via the display/MDI unit 70 which will be described later and further store pieces of data including machining conditions such as an allowable synchronization error. The program and the like stored in the non-volatile memory 14 in use may be deployed into the RAM unit 13. Also, the ROM 12 may be configured to store various system programs for executing processes related to an edit mode necessary to create and edit the NC program and other necessary processes (including a system program for an allowable synchronization error change function).

The interface 15 is an interface for interconnecting the numerical controller 1 and an external device 72 such as an adapter. The NC program and various parameters may be read from the external device 72. Also, the NC program edited in the numerical controller 1 may be stored in an external storage unit (not shown) via the external device 72. The numerical controller 1 further includes a programmable machine controller (PMC) 16. The PMC 16 is configured to output a signal, based on a sequence program incorporated in the numerical controller 1, to a peripheral device (e.g., an actuator such as a robot hand for tool change) of the machine tool via an input/output (I/O) unit 17 to control the peripheral device. The PMC 16 is further configured to receive signals of various switches or the like of a control panel provided on a body of the machine tool, perform necessary signal processing in response to the received signals, and then send the signals to the CPU 11.

The display/MDI unit 70 is a manual data input device that includes a display, a keyboard, and the like. An interface 18 receives commands and data from the keyboard of the display/MDI unit 70 and sends the commands and data to the CPU 11. An interface 19 is connected to the control panel 71 that includes a manual pulse generator or the like used in manually driving the individual axes.

The axis control circuit 30 for controlling axes of the machine tool is configured to receive an axis movement command amount from the CPU 11 and output an axis command to a servo amplifier 40. The servo amplifier 40 is configured to receive the axis command and drive a servo motor 50 configured to move the axes of the machine tool. A position/speed detector is incorporated in the servo motor 50 for the axes and position/speed feedback signals from the position/speed detector are fed back to an axis control circuit 30 so as to perform feedback control on the position and speed. It should be noted that the hardware configuration diagram of FIG. 1 only describes one axis control circuit 30, one servo amplifier 40, and one servo motor 50, but the number of them will actually be equal to that of the feed axes provided in the machine tools belonging to individual systems to be controlled. For example, in the case of a rigid tapping machine capable of machining an inclined surface of a workpiece, the rigid tapping machine includes, as the feed axes, a rotation axis for causing a tool to vertically face the inclined surface of the workpiece subjected to the rigid tapping in addition to linear axes (at least two axes) for moving the workpiece and the tool relative to each other, so that the axis control circuits 30, the servo amplifiers 40 and the servo motors 50 are provided as many as the total number of these axes.

The spindle control circuit 60 is configured to receive a spindle rotation command addressed to a manufacturing machine and output a spindle speed signal to a spindle amplifier 61. The spindle amplifier 61 is configured to receive this spindle speed signal and cause the spindle motor 62 of the manufacturing machine to rotate at a rotation speed instructed, and drive the tool. A position coder 63 is coupled to the spindle motor 62, the position coder 63 is configured to output a feedback pulse in synchronization with the rotation of the spindle, and the feedback pulse is read by the CPU 11.

Figure 2:
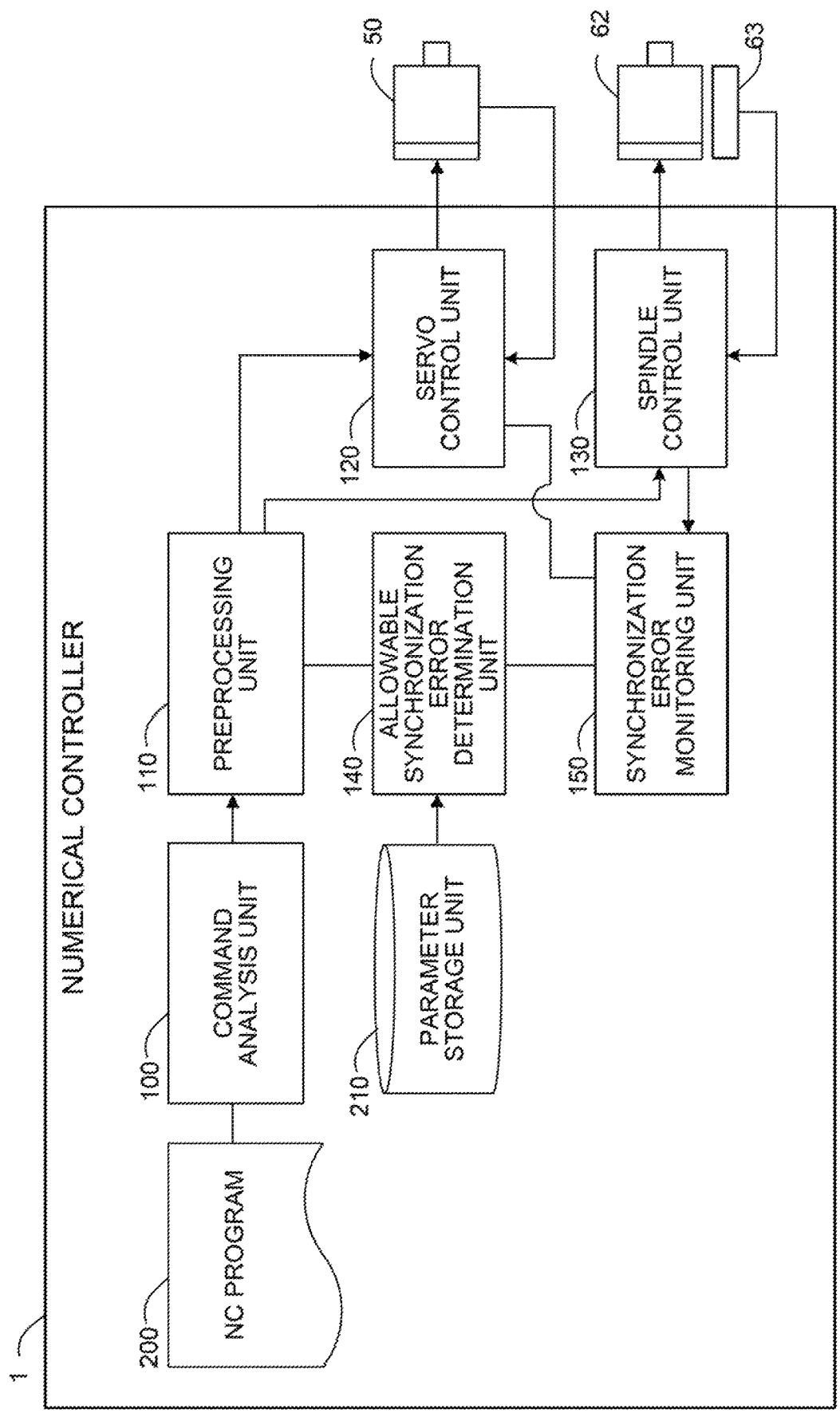
FIG. 2 is a schematic functional block diagram of the numerical controller illustrated in FIG. 1.

FIG. 2 is a schematic functional block diagram illustrating principal portions of the numerical controller according to an embodiment of the present invention in a case where a system program for achieving an interference avoidance function of the present invention is implemented in the numerical controller 1 illustrated in FIG. 1.

The functional blocks illustrated in FIG. 2 are realized by the CPU 11 of the numerical controller 1 illustrated in FIG. 1 executing the control function of the machine tool and the system program for the allowable synchronization error change function and controlling the operations of the individual units of the numerical controller 1. The numerical controller 1 of this embodiment includes a command analysis unit 100, a preprocessing unit 110, a servo control unit 120, a spindle control unit 130, an allowable synchronization error determination unit 140, and a synchronization error monitoring unit 150. Also, a parameter storage unit 210 is provided on the non-volatile memory 14, where the parameter storage unit 210 is configured to store an allowable synchronization error between the spindle and the feed axis specified by an operator. The allowable synchronization error of the individual feed axes stored in the parameter storage unit 210 is specified as an allowable synchronization error in a workpiece coordinate system. The allowable synchronization errors of the individual feed axes stored in the parameter storage unit 210 may be specified in advance by the operator via the display/MDI unit 70 or the like.

The command analysis unit 100 reads command blocks included in the NC program 200 stored in the non-volatile memory 14, analyzes the command blocks that have been read, and creates command data for driving the feed axis to be controlled (driven by the servo motor 50) and the spindle to be controlled (driven by the spindle motor 62).

The preprocessing unit 110 is configured to carry out known interpolation processing and acceleration/deceleration processing on the basis of the command data that has been created by the command analysis unit 100 and outputs the data on which the processing has been performed to the servo control unit 120 and the spindle control unit 130. Also, if the control of the feed axis and the spindle that are scheduled to be performed is performed for the rigid tapping on the inclined surface, then the preprocessing unit 110 obtains an inclination angle of the workpiece coordinate system X' Y' Z' with respect to the machine coordinate system XYZ on the basis of the inclination or the like of the rotation axis and outputs the inclination angle that has been obtained to the allowable synchronization error determination unit 140. It should be noted that, while various schemes may be contemplated as the methodology for the preprocessing unit 110 to obtain the inclination angle, in addition to the one based on the inclination of the rotation axis, for example, a scheme according to which a reference plane is defined and an inclination with respect to the reference plane is defined as the inclination angle, and any appropriate scheme may be relied on as long as it is a method for defining the inclination angle that can uniquely determine the inclination angle of the inclination surface of the workpiece.

The servo control unit 120 and the spindle control unit 130 controls the servo motor 50 and the spindle motor 62, respectively, which drive the axes to be controlled, on the basis of the data received from the preprocessing unit 110. Also, the servo control unit 120 and the spindle control unit 130 are configured to output the positions of the individual motors that are fed back from the servo motor 50 and the spindle motor 62 to the synchronization error monitoring unit 150. It should be noted that, although omitted in FIG. 2, the servo control unit 120 and the servo motor 50 exist as many as the number of the feed axes to be controlled.

The allowable synchronization error determination unit 140 is configured to determine the allowable synchronization error actually used in the machine coordinate system on the basis of the allowable synchronization error between the spindle and the feed axes (three axes of X, Y, and Z axes in this embodiment), which is specified in advance in the parameter storage unit 210, and an inclination angle of the workpiece coordinate system X' Y' Z' with respect to the machine coordinate system XYZ, which has been received from the preprocessing unit 110, and output the determined allowable synchronization error to be used in the machine coordinate system to the synchronization error monitoring unit 150.

An example of a method of computation of the allowable synchronization error used in the machine coordinate system by the allowable synchronization error determination unit 140 will be described with reference to FIG. 3.

Figure 3:
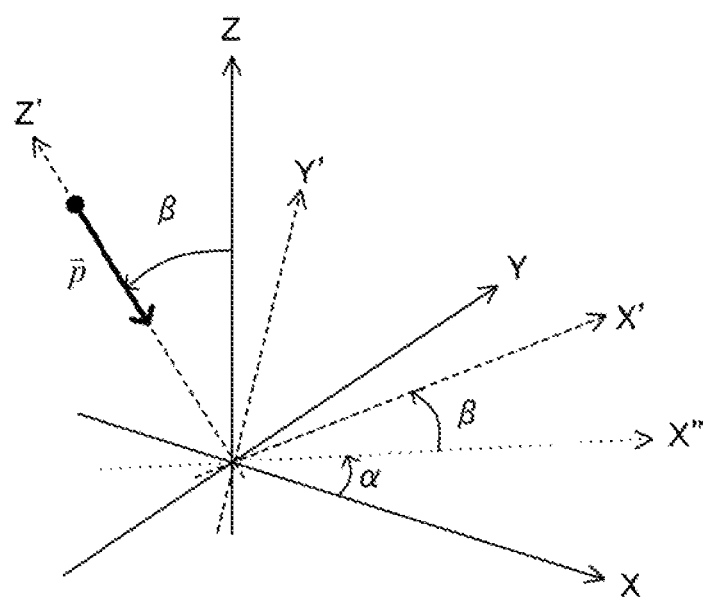
FIG. 3 is a diagram for explanation of a method of computing an allowable synchronization error.
Figure 4:
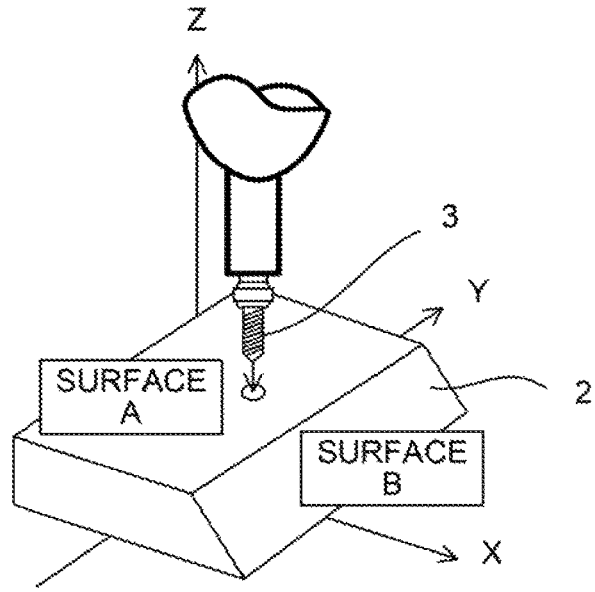
FIG. 4 is a diagram for explanation of rigid tapping according to prior-art technology.

FIG. 3 illustrates by way of example the machine coordinate system XYZ and a workpiece coordinate system X'Y'Z' inclined with respect to the machine coordinate system. Referring to FIG. 3, the workpiece coordinate system is obtained by rotating the machine coordinate system by the workpiece coordinate system rotation angle α about the Z axis and further rotating the rotated machine coordinate system by the workpiece coordinate system rotation angle β about the rotated Y axis (Y' axis). Also, the Z' axis is defined as the tap axis. At this point, if the movement vector of the tap axis is given as vector p, then the amount of change of each axis at the time of tapping operation with respect to the inclined surface can be expressed by the following expression (1):

$$(|\vec{X}|, |\vec{Y}|, |\vec{Z}|) = |\vec{p}|(\sin\beta\cos\alpha, \sin\beta\sin\alpha, \cos\beta) \quad (1)$$

Here, the component ratio of each feed axis with respect to the movement distance in the tap direction at the time of tapping process performed on the inclined surface can be grasped by the expression (1). Accordingly, if the synchronization error with respect to the spindle in the tap direction is given as Et and the allowable synchronization error is distributed among the individual axes of the machine coordinate system according to the component ratios of the respective feed axes with reference to the $E_t$, then the allowable synchronization error between each spindle and each feed axis ($X_{err}$, $Y_{err}$, $Z_{err}$) can be expressed by the following expression (2):

$$(X_{err}, Y_{err}, Z_{err}) = E_t(\sin\beta\cos\alpha, \sin\beta\sin\alpha, \cos\beta) \quad (2)$$

In addition, if the allowable synchronization errors between a spindle and each feed axis when the component ratio of each feed axis with respect to the movement distance in the tap direction is 100% (tapping in a direction parallel to the X axis, tapping in a direction parallel to the Y axis, and tapping in a direction parallel to the Z axis) are given as $E_x$, $E_y$, and $E_z$, respectively, then the allowable synchronization error in consideration of the component ratios of individual feed axes can be expressed by the following expression (3):

$$(X_{err}, Y_{err}, Z_{err}) = (E_x\sin\beta\cos\alpha, E_y\sin\beta\sin\alpha, E_z\cos\beta) \quad (3)$$

It may be noted here that the expressions (2) and (3) vary depending on the axis of the rotation center, as a result, each of those expressions has six variations. For example, if allowable synchronization errors between a spindle and each of the feed axes in a case where the workpiece coordinate system is obtained by rotating the machine coordinate system by the workpiece coordinate system rotation angle α about the Z axis and further rotating the rotated machine coordinate system by the workpiece coordinate system rotation angle β about the rotated X axis (X' axis) (tapping in a direction parallel to the X axis, tapping in a direction parallel to the Y axis, and tapping in a direction parallel to the Z axis) are given as $E_x$, $E_y$, $E_z$, respectively, then the allowable synchronization error in consideration of the component ratios of individual feed axes can be expressed by the following expression (4):

$$(X_{err}, Y_{err}, Z_{err}) = (E_x \sin \beta \sin \alpha, E_y \sin \beta \cos \alpha, E_z \cos \beta) \quad (4)$$

Figure 5:
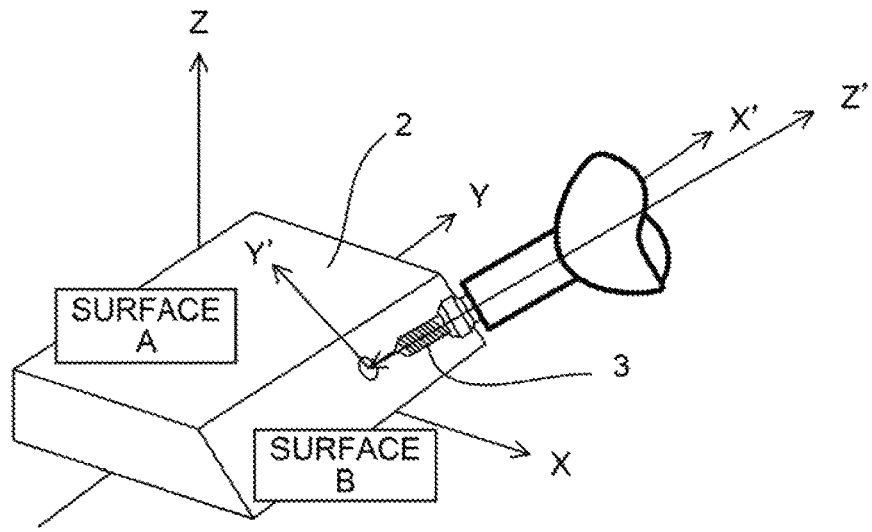
FIG. 5 is a diagram for explanation of rigid tapping on a cutting surface inclined with respect to a machine coordinate system.

For example, in a case where rigid tapping is performed on the inclined surface B illustrated in FIG. 5, and if the allowable synchronization error ($E_x$, $E_y$, $E_z$) is set in advance to (300, 300, 500) and the workpiece coordinate system is obtained by rotating the machine coordinate system by the workpiece coordinate system rotation angle α=90° about the Z axis and further rotating the rotated machine coordinate system by the workpiece coordinate system rotation angle β=60° about the rotated X axis (X' axis), then the allowable synchronization error ($X_{err}$, $Y_{err}$, $Z_{err}$) in consideration of the component ratios of individual axes is (260, 0, 250) in accordance with the expression (4).

The synchronization error monitoring unit 150 monitors the positions of the spindle and each of the feed axes acquired from the servo control unit 120 and the spindle control unit 130, respectively, and checks if the synchronization error between the spindle and each of the feed axes falls within the range of the allowable synchronization error determined by the allowable synchronization error determination unit 140. The synchronization error monitoring unit 150 generates an alarm or the like when the synchronization error between the spindle and each feed axis exceeds the allowable synchronization error. The numerical controller 1 displays, when the generation of the alarm has been detected, the alarm on the display/MDI unit 70 and may stop the execution of the NC program 200 (rigid tapping). It should be noted that the synchronization error monitoring unit 150 may exclude the feed axis of which allowable synchronization error is zero from synchronization error monitoring object. Alternatively, setting a smallest allowable synchronization error in advance for each feed axis, the synchronization error monitoring unit 150 may monitor the feed axis to check if the synchronization error falls within the range defined by the smallest allowable synchronization error.

Whilst the embodiment of the present invention has been illustrated in the foregoing, the present invention is not limited to the above-described embodiment and may be implemented in various modes with modifications made thereto as appropriate.

The invention claimed is:

1. A numerical controller for controlling a machine tool, the machine tool including a spindle adapted to rotate a tool and at least two linear feed axes adapted to move the tool relative to a workpiece, wherein the numerical controller is configured to perform rigid tapping on a cutting surface by moving the tool in a tap direction such that the tool vertically faces the cutting surface, the cutting surface being inclined with respect to at least any one of axes of a machine coordinate system of the machine tool, and wherein the numerical controller comprises:

a processor configured to:

store a predefined first allowable synchronization error, the first allowable synchronization error being an allowable synchronization error specified by a user between a rotation of the spindle and a movement of each axis of a workpiece coordinate system, wherein the tap direction is set to any one of the axis of the workpiece coordinate system;

acquire an inclination angle of the cutting surface of the workpiece coordinate system with respect to the machine coordinate system;

determine a second allowable synchronization error on the basis of the predefined first allowable synchronization error and the inclination angle, the second allowable synchronization error being used in the machine coordinate system for a determined allowable synchronization error between the spindle and the feed axis; and monitor a synchronization error between the spindle and the feed axis on the basis of the determined allowable synchronization error.

* * * * *